United States Patent
Davis et al.

[15] 3,650,852
[45] Mar. 21, 1972

[54] SILICONE RESIN COMPOSITIONS

[72] Inventors: Francis Cecil Davis; John Chapman Pirie, both of Adrian, Mich.

[73] Assignee: Stauffer-Wacker Silicone Corporation, Adrian, Mich.

[22] Filed: July 20, 1970

[21] Appl. No.: 56,684

Related U.S. Application Data

[63] Continuation-in-part of Ser. No. 714,792, Mar. 21, 1968, abandoned.

[52] U.S. Cl. .................... 260/46.5 R, 117/124 F, 117/123 D, 260/18 S, 260/33.6 SB, 260/33.8 SB, 260/46.5 E, 260/46.5 G, 260/448.2 N
[51] Int. Cl. ........................................................ C08f 11/04
[58] Field of Search .................... 260/46.5 R, 46.5 E, 46.5 G, 260/18 S, 448.2 N, 33.6 SB, 33.8 SB; 117/124 F

[56] References Cited

UNITED STATES PATENTS

3,474,069  10/1969  Thomas ................................ 260/46.5

*Primary Examiner*—Donald E. Czaja
*Assistant Examiner*—M. I. Marquis
*Attorney*—Marion D. Ford

[57] ABSTRACT

A silicone resin composition is prepared by adding a zirconium or lead salt of an organic acid to an alkoxylated organosilane and thereafter partially hydrolyzing the reaction product. The composition is amenable to being deposited on a porous substrate in various ways, but is preferably applied in dilute solution in an organic solvent.

9 Claims, No Drawings

SILICONE RESIN COMPOSITIONS

This application is a continuation-in-part application of applicants' copending application Ser. No. 714,792, filed on Mar. 21, 1968, and now abandoned.

The present invention relates to silicone resin compositions, which may be used as water repellents for masonry materials.

It has been known, that silicone resins may be employed in various compositions to render a porous substrate water repellent. And it has been accepted that the effectiveness of a water repellent on a porous surface is accurately reflected by the contact angle of a drop of water applied to the surface. Yet many of the silicone resin compositions when applied to a porous substrate exhibit surprisingly low contact angles.

Therefore, it is an object of this invention to provide a silicone resin composition which exhibits water repellent properties when applied to a porous substrate. Another object of this invention is to provide a composition which will permit a treated porous surface to "breathe" or transmit water vapor. Still another object of this invention is to provide a silicone resin composition which will impart improved contact angles when applied to a porous substrate. A further object of this invention is to provide a silicone resin composition having improved water repellent properties after prolonged exposure to weather.

The foregoing objects and others are accomplished in accordance with this invention, generally speaking, by providing a silicone resin composition which comprises adding zirconium or lead salts or organic acids to alkoxylated organosilanes and thereafter partially hydrolyzing the reaction product to form a composition having an improved contact angle.

In other words, zirconium or lead salts of organic acids are reacted with alkoxylated organosilanes which are then partially hydrolyzed to form a silicone resin composition which imparts improved water repellent properties to porous substrates.

In the formation of the partially hydrolyzed composition of this invention, the silane derivatives should contain from about one to three hydrocarbon groups and the remaining valences of the silicon atom may be satisfied by any of the well-known readily hydrolyzable radicals such as halogen, alkoxy, aryloxy and amino radicals.

Preferably, these silane derivatives are formed from a mixture of organohalosilanes of the formula $R_mSiX_n$ wherein R represents an organic group having from one to 18 carbon atoms; X is a halogen group and $m$ is a number greater than 0; $n$ is a number greater than 1 and the sum of $m$ and $n$ is equal to 4.

Suitable examples of the organohalosilanes are methyltrichlorosilane, ethyltrichlorosilane, propyltrichlorosilane, dimethyldichlorosilane, butyltrichlorosilane, amyltrichlorosilane, hexyltrichlorosilane, octyltrichlorosilane, diethyldichlorosilane, dipropyldichlorosilane, dibutyldichlorosilane, dihexyldichlorosilane, dioctyldichlorosilane, phenyltrichlorosilane, phenylmethyldichlorosilane, octylmethyldichlorosilane, stearyltrichlorosilane, chlorophenylmethyldichlorosilane, trifluorotolylmethyldichlorosilane and mixtures thereof.

The alkoxylated organosilanes may be prepared by reacting organohalosilanes with an alcohol, preferably an alcohol having from one to four carbon atoms, at a temperature of from about 0° to about 50° C. in the presence of an organic solvent, preferably an aromatic solvent such as benzene, xylene, toluene and the like. During the alkoxylation step, the organohalosilanes are converted to alkoxyorganosilanes with the evolution of hydrogen halide. The temperature is increased to distill off the excess alcohol and the hydrogen halide, yielding an alkoxylated organosilane solution which is then treated to reduce its acid content.

Zirconium or lead salts of organic acids are added to the alkoxylated organosilane solution and heated to reflux temperature for a period of time ranging from about 1 to 10 hours, preferably from about 1 to 6 hours and more preferably from about 1 to 2 hours. A sufficient amount of water is added to the reaction mixture and again refluxed for from 1 to 6 hours, preferably from about 1 to 2 hours, to hydrolyze from 50 to 80 percent of the alkoxy groups linked to the silicon atoms. The partially hydrolyzed composition is separated from the alcohol by any conventional technique known in the art such as by fractional distillation and the like, yielding a polysiloxane resin solution having Si—O—Si linkages.

In treating the alkoxylated organosilanes to reduce their acidity content, any basic material may be employed. For example, alkali metal alcoholates, alkali metal hydroxides, carbonates and bicarbonates may be used to neutralize the alkoxylated product. Examples of suitable basic materials are sodium methylate, sodium carbonate, sodium bicarbonate, sodium hydroxide and the like.

As mentioned previously, a sufficient amount of water should be added to the alkoxylated product to hydrolyze from 50 to 80 percent of the alkoxy groups present on the silicon atoms. However, where a basic material such as sodium bicarbonate or sodium hydroxide is used, water is formed as a by-product of the neutralization step which must be taken into consideration when calculating the amount of water necessary to maintain the hydrolysis level within the desired range. Generally where the hydrolysis level exceeds about 85 percent, the polysiloxane resin has a tendency to gel.

In a preferred embodiment, a mixture of organohalosilanes such as methyltrichlorosilane, dimethyldichlorosilane and propyltrichlorosilane may be used. Although the ratio of organohalosilanes is not critical, it is preferred that the mol ratio of trifunctional compounds to difunctional compounds be at least 2:1. In other words, the mol ratio of compounds having three halogen groups to compounds having two halogen groups should be at least 2:1 and more preferably from 3:1 to 4:1.

Also, it has been found that the residue obtained from the hydrolysis of propyltrichlorosilane, which boils above about 142° C., may be substituted for the propyltrichlorosilane in the above described embodiment. However, when this residue is substituted for the propyltrichlorosilane in the above composition, the ratio of propyl groups to other groups should be from about 1:1 to 1:10 and more preferably 1:5.

We have found that incorporation of zirconium or lead salts of mono- or dibasic organic acids will result in a composition having improved contact angles. Examples of suitable salts are lead acetate, lead butyrate, lead caproate, lead octoate, lead formate, lead isobutyrate, lead myristate, lead oleate, lead oxalate, lead palmitate, lead stearate, lead tartrate, lead lactate, lead citrate, lead naphthenate as well as zirconium and zirconyl salts of organic acids such as zirconium tetraacetate, zirconium tetrabutyrate, zirconium tetraoctoate, zirconium tetraformate, zirconium tetralaurate, zirconium tetraisobutyrate, zirconium tetraoleate, zirconium tetrapalmitate, zirconium tetrastearate, zirconium tetratartrate, zirconium tetralactate, zirconium tetracitrate, zirconyl stearate, zirconyl 2-ethylhexanoate, zirconium naphthenate and the like.

The proportion of zirconium and lead salts used in accordance with the present invention may be varied over a considerable range, extending from as low as about 0.25 percent up to about 4.5 percent, preferably from about 0.8 to about 3 percent and more preferably from about 1.0 to about 2.5 percent as metal based on the weight of the organohalosilanes. Proportions of the metallic salts within the range of from about 1.0 to 3 percent based on the metal content have been found advantageous under usual conditions. The shelf stability of the composition is an important consideration in determining the proportion of metallic salts to be added to these compositions. We have found, however, that solutions containing as much as 3 percent zirconium tetraacetate based on the metal content may be stored for at least 6 months under room temperature conditions without gelling. In using concentrations up to about 4 percent zirconium, the resultant resin films have exhibited improved contact angles.

The composition may be applied to porous surfaces as a dilute solution. It is preferred that the composition be dissolved in a low boiling organic solvent to a solids concentration of from about 4 to about 20 percent and more preferably from about 5 to 8 percent and then sprayed or brushed on the porous substrate in the form of a thin film. The solvent should be of sufficient volatility that evaporation will occur under atmospheric conditions. Examples of preferred solvents are toluene, xylene, benzene, ligroin, low boiling naphthas, aliphatic hydrocarbons, halogenated hydrocarbons, such as chlorinated hydrocarbons and the like.

Once the composition has been applied to the porous surface, the solvent is permitted to evaporate to form a thin resin film thereon.

These compositions may be applied to any porous type substrates, particularly masonry substrates.

Surprisingly, it was found that the inclusion of but a minor proportion of the metal salt greatly improved the contact angle of a drop of water applied to a porous surface and provided a composition which was superior in this respect to many of the conventional water repellent compositions commercially available.

The following examples are illustrative of the invention and are not to be construed as limiting the scope of the invention. All parts are by weight unless otherwise specified.

EXAMPLE 1 a. A mixture of chlorosilanes consisting of about 89.7 parts of methyltrichlorosilane, about 25.8 parts of dimethyldichlorosilane and about 35.5 parts of propyltrichlorosilane is added to a reactor containing about 175 parts of xylene. About 84.9 parts of anhydrous methanol are added to the mixture with agitation and refluxed for a period of about 4 hours and then cooled to about 25° C. The reaction mixture is neutralized by dropwise addition of about 66 parts of a 25 percent solution of sodium methylate in methanol until a drop of material applied to indicator paper gives a pH between 4.0 and 4.5. The reaction mixture is then filtered to yield a clear colorless filtrate.

Approximately 2.5 parts of zirconium tetraacetate are added to the filtrate with agitation and refluxed for 2 hours. The reaction mixture is cooled to about 55° C., followed by the addition of about 15.1 parts of water. The reaction mixture is refluxed for about 2 hours and fractionally distilled to remove the methanol formed during hydrolysis. The residue is then filtered, yielding a clear colorless silicone resin solution.

The silicone resin solution prepared above is further diluted with ligroin to form a 5 percent by weight resin solution which is the applied to previously cleaned glass sides. The treated glass slides are stored at a temperature of from about 21° to 32° C. at a relative humidity of from 50 to 90 percent for about 48 hours. The slides are removed and the contact angles determined by applying a drop of water to the coated surface layer on a horizontal plane and measuring by means of a cathetometer and a small protractor.

b. In a comparison example, about 5.15 parts of zirconium tetraacetate are added to the silicone resin composition in accordance with the procedure described in Example 1(a) above and applied to glass slides and the contact angle is measured as described in said example.

c. In a comparison example, about 10.3 parts of zirconium tetraacetate are added to the silicone resin composition in accordance with the procedure described in Example 1(a) above and applied to glass slides and the contact angle is measured as described in said example.

EXAMPLE 2

A mixture of chlorosilanes consisting of about 89.7 parts of methyltrichlorosilane, about 25.8 parts of dimethyldichlorosilane and about 35.5 parts of propyltrichlorosilane is added to a reactor containing about 175 parts of xylene. About 84.9 parts of anhydrous methanol are added to the mixture with agitation and the reaction mixture heated to reflux for a period of about 4 hours. The reaction mixture is cooled to about 25° C. and about 66 parts of a 25 percent solution of sodium methylate in methanol are added dropwise until a drop of material added to wet indicator paper gives a pH between 4.0 and 4.5. The reaction mixture is filtered to produce a clear colorless filtrate.

Approximately 15.1 parts of water are added to the filtrate and refluxed for 2 hours at about 70° C. The reaction product is fractionally distilled to remove the methanol formed during hydrolysis. The residue is filtered, yielding a clear colorless resin solution.

The silicone resin solution prepared above is further diluted with ligroin to form a 5 percent by weight resin solution which is applied to previously cleaned glass slides. The treated glass slides are stored at a temperature of from about 21° to 32° C. and at a relative humidity of from 50 to 90 percent for about 48 hours. The slides are removed and the contact angles determined as described in Example 1(a) above.

EXAMPLE 3

In accordance with the procedure described in Example 2, approximately 10.3 parts of zirconium tetraacetate are added to the silicone resin after hydrolysis and prior to dilution with ligroin and refluxed for about 2 hours. The reaction product is fractionally distilled and the residue filtered, yielding a colorless product.

The silicone resin solution is diluted with ligroin to a 5 percent solids concentration and applied to glass slides in accordance with the procedure described in the above mentioned example.

The contact angles of the products prepared in Examples 1 to 3 are illustrated in Table I. These examples show that zirconium or lead salts must be added to the composition prior to hydrolysis in order to be effective.

TABLE I

| Example No. | Zirconium, % | Contact Angles, degrees |
| --- | --- | --- |
| 1(a) | 0.46 | 87.0 |
| 1(b) | 0.95 | 90.3 |
| 1(c) | 1.90 | 104.4 |
| 2 | — | 83.0 |
| 3 | 1.90 | 77.2 |
| Control | — | 38.5 |

EXAMPLE 4

Approximately 20 parts of zirconium tetraacetate are added to the silicone resin composition in accordance with the procedure described in Example 1(a) and applied to glass slides. The contact angles exceeded 100°.

EXAMPLE 5

Concrete cubes are immersed for 30 seconds in a 5 percent ligroin solution prepared in accordance with the procedure described in Example 1(c) and stored at a temperature of from 21° to 32° C. and at a relative humidity of from 50 to 90 percent for 48 hours. The cubes exhibit contact angles of about 121°.

In a similar experiment, concrete cubes are treated with the silicone resin prepared in accordance with Example 2. The contact angles are about 113 degrees.

EXAMPLE 6

In accordance with the procedure described in Example 1(a), about 5 parts of lead acetate are substituted for the zirconium tetraacetate. Concrete cubes are treated with this composition in accordance with Example 4 and exhibit contact angles of about 125°.

EXAMPLE 7

In accordance with the procedure described in Example 1(a), about 159 parts of isopropanol are substituted for the anhydrous methanol and the reaction mixture refluxed for a period of about 4 hours and then cooled to about 25° C. The reaction mixture is neutralized with 25 percent solution of sodium methylate in methanol until a drop of material applied to indicator paper gives a pH between 4.0 and 4.5. The reaction mixture is then filtered to yield a clear colorless filtrate.

About 2.5 parts of zirconium tetraacetate are added to the filtrate with agitation and refluxed for 2 hours, cooled to about 55° C. and thereafter diluted with about 15.1 parts of water. The reaction mixture is refluxed for about 2 hours and fractionally distilled to remove the isopropanol formed during hydrolysis. The residue is then filtered, yielding a clear colorless silicone resin solution.

EXAMPLE 8

In accordance with the procedure described in Example 1(a), about 122 parts of ethanol are substituted for the anhydrous methanol and the reaction mixture refluxed for a period of about 4 hours and then cooled to about 25° C. The reaction mixture is neutralized with a 25 percent solution of sodium methylate in methanol until a drop of material applied to indicator paper gives a pH between 4.0 and 4.5. The reaction mixture is then filtered to yield a clear colorless filtrate.

About 2.5 parts of zirconium tetraacetate are added to the filtrate with agitation and refluxed for 2 hours, cooled to about 55° C. and thereafter diluted with about 15.1 parts of water. The reaction mixture is refluxed for about 2 hours and fractionally distilled to remove the ethanol formed during hydrolysis. The residue is then filtered, yielding a clear colorless silicone resin solution.

In another embodiment phenyltrichlorosilane may be substituted for propyltrichlorosilane in approximately the same mole ratio to prepare phenyl containing resinous compositions. In addition higher alcohols, such as, butyl alcohol may be substituted for methanol in accordance with the procedures described hereinabove to produce resinous compositions having improved contact angles.

Other zirconium and lead salts such as zirconium oxalate, zirconium stearate, zirconium octoate, lead oxalate, lead stearate and the like may be substituted for the zirconium acetate or lead acetate in accordance with the procedures described herein with substantially the same results.

It is obvious that the composition of this invention provides a coating which gives improved contact angles to a drop of water applied thereto when compared to a surface treated with a similar composition free of zirconium or lead salts of an organic acid.

Although the present invention has been defined specifically with reference to the above noted examples, it should be understood that these examples are merely illustrative of the invention. Other variations which will become apparent to those skilled in the art are intended to be included within the scope of the invention.

The invention claimed is:

1. A water repellent silicone composition prepared by contacting an organohalosilane of the formula:

$$R_mSiX_n$$

wherein R is an organic group having from one to 18 carbon atoms, X is a halogen, $m$ is a number greater than 0, $n$ is a number greater than 1 and the sum of $m$ and $n$ is equal to 4, with an alcohol having from one to four carbon atoms at a temperature of from about 0° to 50° C. in the presence of an organic solvent to form an alkoxylated organosilane, neutralizing the alkoxylated organosilane with a base selected from the group consisting of alkali metal alcoholates, alkali metal hydroxides, alkali metal carbonates, and alkali metal bicarbonates, adding from 0.25 to 4.5 percent as metal based on the weight of the organohalosilane of a metallic salt selected from the class consisting of zirconium and lead salts of an organic carboxylic acid to the neutralized alkoxylated organosilane and thereafter refluxing the alkoxylated organosilane in the presence of sufficient water to hydrolyze from 50 to 80 percent of the silicone bonded alkoxy groups.

2. The composition of claim 1 wherein the metal is present in an amount of from 1.0 to about 2.5 percent based on the weight of the organohalosilane.

3. The composition of claim 1 wherein the metallic salt is zirconium acetate.

4. The composition of claim 1 wherein the metallic salt is lead acetate.

5. The composition of claim 1 wherein the silicone composition is obtained from a mixture of organohalosilanes.

6. The composition of claim 5 wherein the mixture comprises methyltrichlorosilane, dimethyldichlorosilane and propyltrichlorosilane in a mol ratio of 3:1:1.

7. A method for preparing a water repellent silicone composition giving an improved contact angle between a drop of water and a substrate coated with said composition, which comprises contacting an organohalosilane of the formula:

$$R_mSiX_n$$

wherein R is an organic group having from one to 18 carbon atoms, X is a halogen, $m$ is a number greater than 0, $n$ is a number greater than 1 and the sum of $m$ and $n$ is equal to 4, with an alcohol having from one to four carbon atoms at a temperature of from 0° to 50° C. in the presence of an organic solvent to form an alkoxylated organosilane, neutralizing the alkoxylated organosilane with a base selected from the group consisting of alkali metal alcoholates, alkali metal hydroxides, alkali metal carbonates, and alkali metal bicarbonates, adding from 0.25 to 4.5 percent as metal based on the weight of the organohalosilane of a metallic salt selected from the class consisting of zirconium and lead salts of an organic carboxylic acid to the alkoxylated organosilane and thereafter refluxing the alkoxylated organosilane mixture with sufficient water to form a polysiloxane having Si—O—Si linkages and having a hydrolysis level of from 50 to 80 percent.

8. The method of claim 7 wherein the organohalosilane is mixture of organosilanes.

9. The method of claim 8 wherein the mixture of organosilanes contains trifunctional and difunctional groups in a mol ratio of at least 2:1.

* * * * *